United States Patent [19]
Gee

[11] Patent Number: 4,571,812
[45] Date of Patent: Feb. 25, 1986

[54] METHOD FOR MAKING A SOLAR CONCENTRATOR AND PRODUCT

[75] Inventor: Randall C. Gee, Golden, Colo.

[73] Assignee: Industrial Solar Technology, Denver, Colo.

[21] Appl. No.: 580,820

[22] Filed: Feb. 16, 1984

[51] Int. Cl.[4] .............................................. B23P 9/00
[52] U.S. Cl. ........................................ 29/445; 126/438; 156/200; 350/628
[58] Field of Search .................. 29/445, 453; 350/628; 126/438, 439, 271; 156/196, 199, 200, 201

[56] References Cited

U.S. PATENT DOCUMENTS

| | | | |
|---|---|---|---|
| 1,294,486 | 2/1919 | Kuen | 29/445 |
| 2,949,667 | 8/1960 | Cameron et al. | 29/428 |
| 3,959,056 | 5/1976 | Caplan | 156/197 |
| 4,106,484 | 8/1978 | Dame | 126/271 |
| 4,119,365 | 10/1978 | Powell | 350/293 |
| 4,127,926 | 12/1978 | White | 29/453 |
| 4,135,493 | 1/1979 | Kennedy | 126/271 |
| 4,268,332 | 5/1981 | Winders | 156/160 |
| 4,372,027 | 2/1983 | Hutchison | 29/448 |
| 4,390,241 | 6/1983 | Trihey | 350/296 |

Primary Examiner—Howard N. Goldberg
Assistant Examiner—Leonard S. Selman

[57] ABSTRACT

A solar concentrator of substantially parabolic shape is formed by preforming a sheet of highly reflective material into an arcuate section having opposed longitudinal edges and having a predetermined radius of curvature and applying a force to at least one of the opposed edges of the section to move the edges toward each other and into a predetermined substantially parabolic configuration and then supporting it.

10 Claims, 11 Drawing Figures

U.S. Patent   Feb. 25, 1986   Sheet 1 of 2   4,571,812
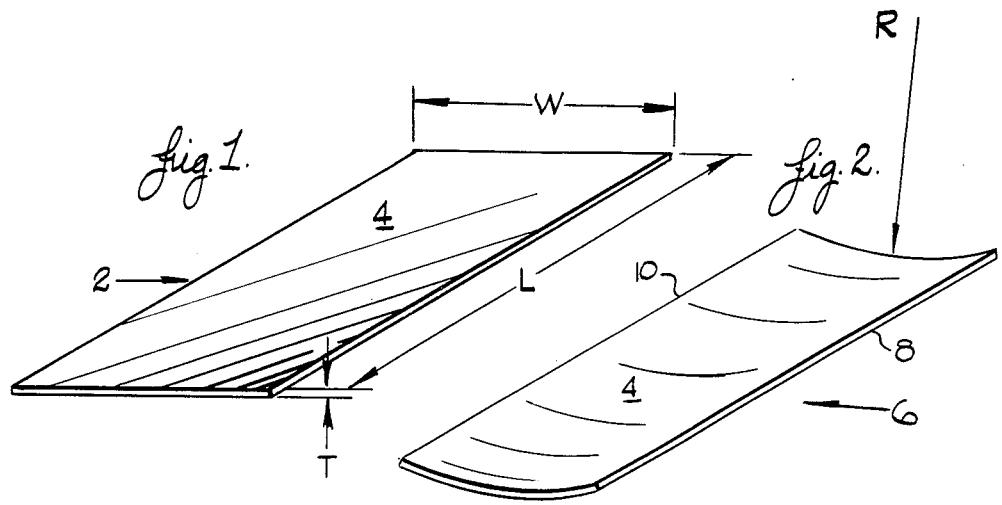
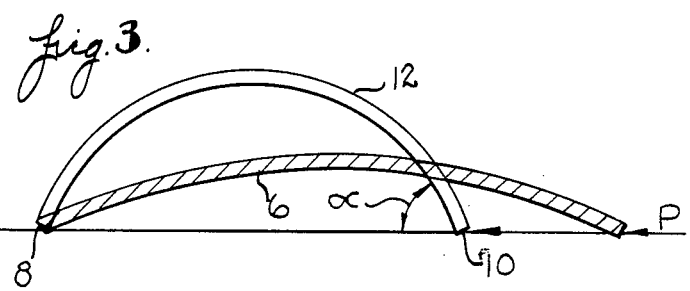
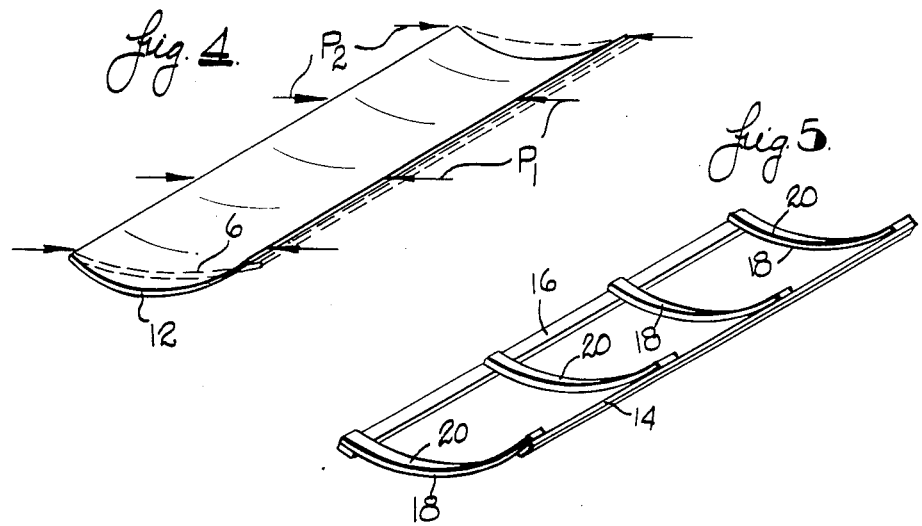

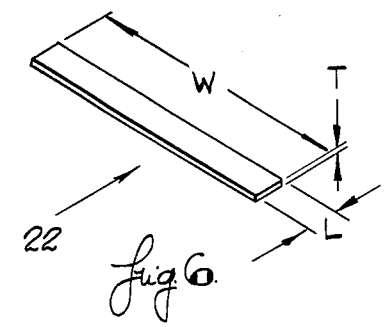
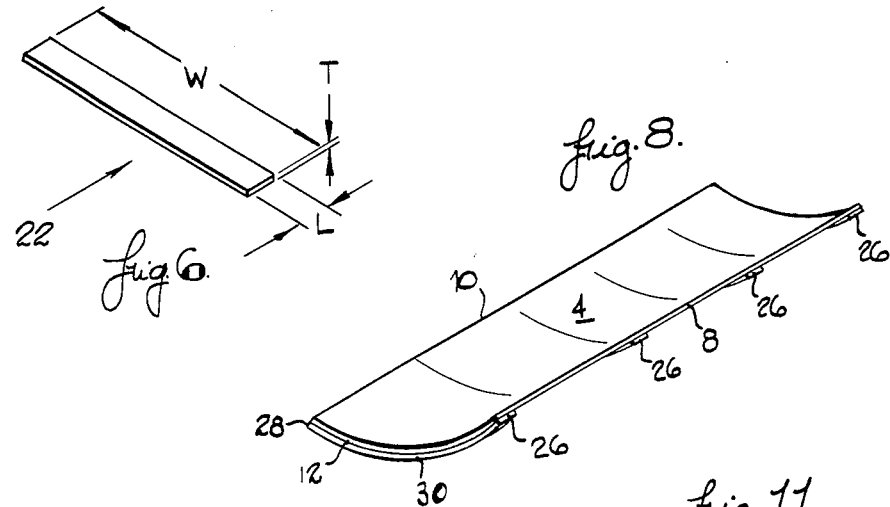
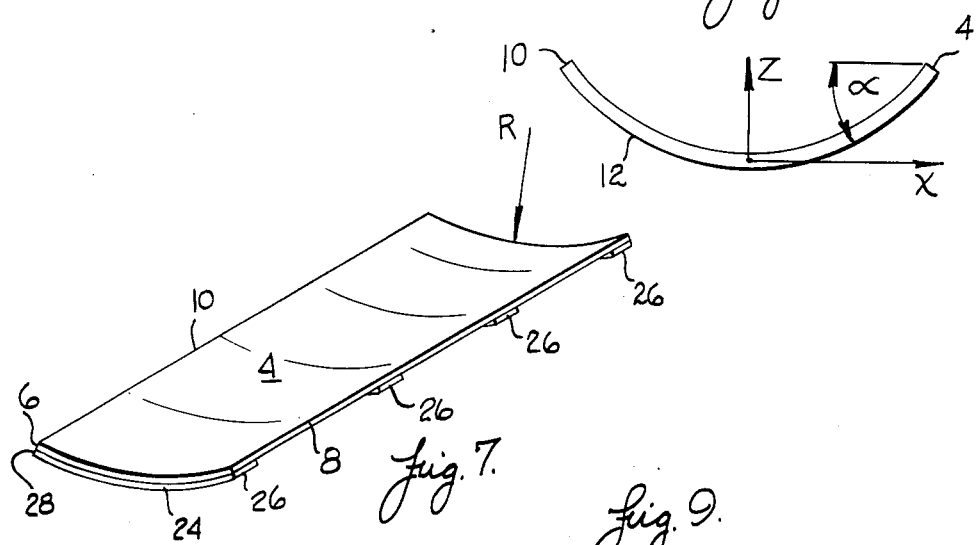
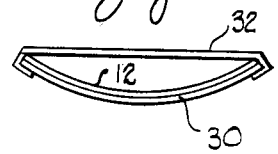
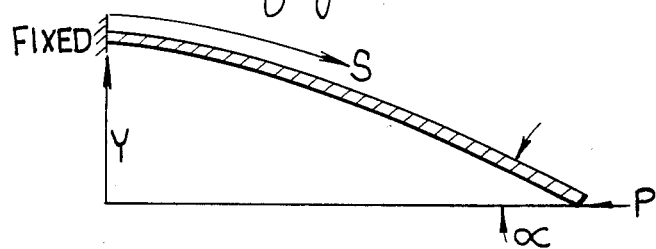

METHOD FOR MAKING A SOLAR CONCENTRATOR AND PRODUCT

FIELD OF INVENTION

This invention relates to solar energy in general and more particularly to trough shaped reflecting concentrators of the parabolic nature and more specifically to a method for making a solar concentrator.

BACKGROUND OF THE INVENTION

For many years, solar energy devices have used reflecting surfaces to concentrate the energy from the sun onto some type of collecting means, such as a tube. The most desirable shape of the reflecting surface has been parabolic. Many different methods have been utilized to form solar concentrators having a parabolic shape. The more common methods use a flat sheet of the base material that is then formed into a parabolic or nearly parabolic shape.

BRIEF DESCRIPTION OF THE INVENTION

This invention is directed to a method in which a sheet comprising a flexible material is subjected to forming processes to change the sheet into a substantially self-sustaining arcuate section having a predetermined radius of curvature having opposed longitudinally extending edges. A force is then applied to at least one of the edges to move the opposed edges toward each other. The application of the force is continued until the shape of the substantially self-sustaining arcuate section has been changed to a predetermined substantially parabolic configuration. Suitable means are then used to retain the sheet in the substantially parabolic configuration.

In another embodiment of the invention, a sheet comprising a flexible material is subjected to forming processes to change the sheet into a substantially self-sustaining arcuate section having a predetermined radius of curvature having opposed longitudinal edges. A plurality of reinforcing ribs of a suitable material are also subjected to forming processes to change the reinforcing ribs into a substantially self-sustaining arcuate section having opposed longitudinal edges and having substantially the same radius of curvature as that of the substantially self-sustaining sheet. At least one substantially self-sustaining reinforcing rib is secured to the substantially self-sustaining sheet and then a force is applied to at least one of the edges to move the opposed edges toward each other. The application of force is continued until the shape of substantially self-sustaining sheet and reinforcing rib has been changed to a predetermined substantially parabolic configuration. Suitable means are then used to retain the sheet and reinforcing rib in the substantially parabolic configuration.

It is an object of this invention to provide a method for consistently forming solar concentrators having a reflecting surface of predetermined substantially parabolic configuration.

It is another object of this invention to provide a method for consistently forming solar concentrators having a reflecting surface of a predetermined substantially parabolic configuration while at the same time providing reinforcing ribs of substantially the same parabolic configuration secured thereto.

It is a further object of the invention to provide products formed by the foregoing methods.

Other features and advantages of the invention will be apparent from the following more particular description of preferred embodiments as illustrated in the accompanying drawings in which like reference characters refer to the same parts throughout the various views. The drawings are not necessarily to scale, emphasis instead being placed upon illustrating the principles of the invention.

BRIEF DESCRIPTION OF THE DRAWING

FIG. 1 is a pictorial view of a sheet of flexible material;

FIG. 2 is a pictorial view of the sheet of FIG. 1 after it has been formed into an arcuate section;

FIG. 3 is a schematic illustration of the application of force to the sheet of FIG. 2;

FIG. 4 is a schematic illustration of another method for the application of force to the sheet of FIG. 2;

FIG. 5 is a pictorial view of a support structure;

FIG. 6 is a pictorial view of a reinforcing rib;

FIG. 7 is a pictorial view of a flexible sheet and a plurality of reinforcing ribs after they have been formed into arcuate sections and secured together;

FIG. 8 is a pictorial view of the structure in FIG. 7 changed into the substantially parabolic configuration.

FIG. 9 is a view similar to FIG. 8 with support structure added.

FIG. 10 is a schematic illustration of a buckled bar with constant initial curvature.

FIG. 11 is a pictorial view of a flexible sheet after it has been formed into an arcuate section and buckled into a substantially parabolic configuration.

DETAILED DESCRIPTION OF THE INVENTION

In FIG. 1, there is illustrated a sheet 2 of a flexible material having a length, a width and a thickness. The sheet 2 comprises a reflecting material, at least on the surface 4, such as polished metal, a silvered metal/glass or a silvered glass/glass laminate, metal covered with a metalized plastic reflective film or any other suitable reflecting material capable of flexing. The sheet 2 is subjected to conventional forming processes, such as by rolling, stamping or otherwise, (not shown) to be changed into an arcuate section 6 having a constant radius of curvature, illustrated in FIG. 2, having opposed longitudinally extending edges 8 and 10. The arcuate section 6 is substantially self-sustaining.

The arcuate section 6 is positioned in suitable apparatus (not shown) so that a force, indicated by the arrow P in FIG. 3, may be applied to at least one edge 10. The force P is of sufficient amount to be able to buckle the arcuate section 6 so as to move the edges 8 and 10 closer together. The application of the force is continued until the arcuate section 6 has been changed into a predetermined substantially parabolic configuration 12. Another modification of the method for applying the force to buckle the arcuate section 6 is illustrated in FIG. 4. In this modification, the arcuate section 6 is placed in suitable apparatus (not shown) so that equal but oppositely directed forces, indicated by the arrows P1 and P2, may be applied to the edges 8 and 10 so as to move the edges closer together. As in relation to FIG. 3, the application of the forces is continued until the arcuate section 6 (dotted line of FIG. 4) has been changed into a predetermined substantially parabolic configuration 12 (solid lines of FIG. 4).

The sheet 2 in the substantially parabolic configuration is then secured to suitable support structure such as that illustrated in FIG. 5. The support structure of FIG. 5 comprises two longitudinal members 14 and 16 having a plurality of reinforcing ribs 18 secured thereto. The reinforcing ribs 18 have been preformed so that at least the inner surfaces 20 thereof have substantially the same parabolic configuration as the sheet 2 in the substantially parabolic configuration 12. Any suitable means, such as adhesive, may be used to secure the sheet 2 in the substantially parabolic configuration 12 to the surfaces 20. It is to be understood that the support structure of FIG. 5 is for illustration purposes only and that any kind of support structure, either in front of or behind the sheet, may be used to support and retain the sheet 2 in the substantially parabolic configuration 12.

A modification of the invention is illustrated in FIGS. 6–8. A reinforcing rib 22 of a flexible material having a length, a width and a thickness is illustrated in FIG. 6. The width of the reinforcing rib 22 is substantially the same as the width of the sheet 2 but the length of the reinforcing rib 22 is substantially less than the length of the sheet 2. The thickness of the reinforcing rib will be as required by the structural considerations. The reinforcing rib may be other than rectangular in cross-section (as in FIG. 6). Other shapes include C-shaped channels, hollow square tubing, T-shaped sections, or any other shape. The reinforcing rib may comprise any material capable of flexing such as aluminum, steel, plastic, or any other similar material. The reinforcing rib is subjected to conventional forming processes, such as by rolling, forming or otherwise (not shown) to be changed into an arcuate section 24 having opposed longitudinally extending edges 26 and 28. The arcuate section 24 is substantially self-sustaining. As illustrated in FIG. 7, a plurality of reinforcing ribs 22 in arcuate sections 24 are secured to the bottom surface of a sheet 2 in the form of an arcuate section 6 by adhesive or any other suitable means. The structure of FIG. 7 is placed in suitable apparatus (not shown) and force (such as illustrated in FIG. 3) is applied to the edges 26 or oppositely directed forces are applied to the edge 26 and 28 (such as illustrated in FIG. 4) to move the edges 8 and 10 and 26 and 28 closer together. In either method, the application of the force is continued until the arcuate section 6 of the sheet 2 and the arcuate sections 24 of the reinforcing ribs 22 of FIG. 7 have been changed into substantially parabolic configurations 12 and 30 of FIG. 8. The sheet 2 in the substantially parabolic configuration 12 and the reinforcing ribs in the substantially parabolic configurations are then suitably supported in any structure, such as the bars 32 in FIG. 9 that connect the edges 26 and 28 which, as stated in relation to the support structure of FIG. 5, is for illustration purposes only.

The theoretical justification for the present invention is based on the analysis of large deflections of buckled bars. For a bar with an initial constant curvature given as $(d\theta/ds)_{initial}$, the deflection equation is given as:

$$EI\left[\left(\frac{d\theta}{ds}\right)_{final} - \left(\frac{d\theta}{ds}\right)_{initial}\right] = -Py$$

where E is Young's Modulus, I is the bending moment of inertia of the bar, P is the buckling load applied at the end of the bar, s is the arc length of the bar, and y is the distance from the end of the bar in the direction noted in FIG. 10.

The equation above can be solved using numerical integration techniques familiar to anyone of ordinary skill in the art to fully define the contour of the buckled bar with constant initial curvature. The contour is uniquely determined given both the initial curvature $(d\theta/ds)$ initial and the side angle of the buckled bar denoted as $\alpha$ in FIG. 10. The side angle $\alpha$ is also shown in FIG. 3. Certain combinations of initial curvature and side angle yield contours that are very nearly parabolic and suitable as an accurate, low-cost concentrating surface for a solar collector. A preferred combination of initial curvature and side angle is:

$(d\theta/ds)_{initial} = 0.25$ radians/unit length and $\alpha = 35°$.

In accordance with this invention, a sheet 2 of flexible material comprising aluminum, having a length of 48 inches, a width of 94 inches and a thickness of 0.040 inches is formed into an arcuate section 6 having an arc length of about 94 inches and a radius of curvature of 127 inches. A force is applied and the edges 8 and 10 moved closer together until the substantially parabolic configuration 12 is reached. In the final substantially parabolic configuration, the linear distance between the edges 8 and 10 is about 87.05 inches, the depth between the plane passing through the edges 8 and 10 and the central line of the substantially parabolic configuration is about 15.60 inches and the side angle $\alpha$ is 35°. This final configuration closely approximates a parabolic shape given by the equation $x^2 = 121.4z$ where the directions of x and z are denoted in FIG. 11.

In another example, a sheet 2 of flexible material comprising aluminum having a length of 120 inches, a width of 48 inches and a thickness of 0.040 inches is formed into an arcuate section 6 having an arc length of about 48 inches and a radius of curvature of about 98 inches. A force is applied and the edges moved closer together until the substantially parabolic configuration 12 is reached. In the final substantially parabolic configuration, the linear distance between the edges 8 and 10 is about 43.06 inches, the depth between the plane passing through the edges 8 and 10 and the central line of the substantially parabolic configuration is about 9.37 inches and the side angle $\alpha$ is 40°. This final configuration closely approximates a parabolic shape given by the equation $x^2 = 49.48z$.

While the preferred embodiments of the invention have been illustrated and described herein, it may be otherwise embodied and practiced within the scope of the following claims.

What is claimed is:

1. A method for making a solar concentrator comprising:

forming a sheet member into a substantially self-sustaining arcuate section of a predetermined constant radius of curvature having opposed longitudinally extending edges;

forming at least one reinforcing rib into a substantially self-sustaining arcuate section having a constant radius of curvature substantially the same as said radius of curvature of said sheet member and having opposed longitudinally extending edges;

securing said formed sheet member to said formed reinforcing rib;

applying a force to at least one of said edges of said reinforcing ribs to move said edges of said reinforcing rib and said edges of said formed sheet member closer together; and continuing the application of said force until said formed sheet member and said formed reinforcing rib have been cnanged to a predetermined substantially parabolic configuration.

2. A method as in claim 1 and further comprising:

applying a force to each of said edges of said formed reinforcing rib to move said edges of said formed rib and said formed sheet member into said substantially parabolic configuration.

3. A method as in claim 1 and further comprising:

supporting said sheet member and said reinforcing rib in said substantially parabolic configuration with rigid supporting members.

4. A method as in claim 3 and further comprising:

forming said sheet member from a highly reflective material.

5. A method as in claim 4 wherein said highly reflective material is selected from a group consisting of:

polished metal, a silvered metal/glass laminate, a silvered glass/glass laminate, metal covered with a metalized plastic film.

6. A method as in claim 4 and further comprising:

securing said sheet member and said reinforcing rib in substantially parabolic configuration to a preformed supporting structure.

7. A method as in claim 6 and further comprising:

using adhesive to secure said sheet member and said reinforcing rib in substantially parabolic configuration to said preformed supporting structure.

8. A method as in claim 1 and further comprising:

forming a plurality of reinforcing ribs into said self-sustaining arcuate sections;

securing together said plurality of said self-sustaining arcuate sections and said plurality of reinforcing ribs in side by side relationship;

applying a substantially even force to each of said reinforcing ribs to move said edges of said sheet members and reinforcing ribs closer together; and continuing the application of said force until said sheet members and said reinforcing ribs have been changed into substantially parabolic configurations.

9. A method as in claim 8 and further comprising:

supporting said plurality sheet members and reinforcing ribs in said substantially parabolic configurations with rigid supporting members.

10. A method as in claim 9 and further comprising:

adhesively securing said plurality of said reinforcing ribs in said substantially parabolic configurations to a preformed support.

* * * * *